US011751265B2

United States Patent
Lu et al.

(10) Patent No.: US 11,751,265 B2
(45) Date of Patent: Sep. 5, 2023

(54) TRIGGER RESPONSE MECHANISM FOR NON-SIMULTANEOUS-TRANSMISSION-AND-RECEPTION MULTI-LINK DEVICES

(71) Applicant: MediaTek Singapore Pte. Ltd., Singapore (SG)

(72) Inventors: Kai Ying Lu, San Jose, CA (US); James Chih-Shi Yee, San Jose, CA (US); Yongho Seok, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/476,414

(22) Filed: Sep. 15, 2021

(65) Prior Publication Data
US 2022/0095401 A1 Mar. 24, 2022

Related U.S. Application Data

(60) Provisional application No. 63/080,143, filed on Sep. 18, 2020.

(51) Int. Cl.
*H04W 76/15* (2018.01)
*H04W 74/08* (2009.01)

(52) U.S. Cl.
CPC .......... *H04W 76/15* (2018.02); *H04W 74/08* (2013.01)

(58) Field of Classification Search
CPC ..... H04W 76/15; H04W 74/08; H04W 16/14; H04W 84/12; H04L 5/0053
See application file for complete search history.

(56) References Cited

U.S. PATENT DOCUMENTS

| | | | | |
|---|---|---|---|---|
| 2014/0329551 A1* | 11/2014 | Ryoo | | H04W 76/27 455/522 |
| 2019/0313466 A1* | 10/2019 | Ko | | H04W 74/08 |
| 2019/0356410 A1* | 11/2019 | Alpert | | H04W 52/367 |
| 2021/0266965 A1* | 8/2021 | Ho | | H04W 56/001 |

* cited by examiner

*Primary Examiner* — Quoc Thai N Vu
(74) *Attorney, Agent, or Firm* — Han IP PLLC; Andy M. Han

(57) ABSTRACT

A station (STA) affiliated with a multi-link device (MLD) that belongs to a non-simultaneous-transmission-and-reception (NSTR) link pair receives a trigger frame from an access point (AP). The STA determines whether to respond to the trigger frame. In response to determining to respond to the trigger frame, the STA transmits a trigger-based (TB) physical-layer protocol data unit (PPDU) with at least one restriction.

20 Claims, 7 Drawing Sheets

TRIGGER RESPONSE MECHANISM FOR NON-SIMULTANEOUS-TRANSMISSION-AND-RECEPTION MULTI-LINK DEVICES

CROSS REFERENCE TO RELATED PATENT APPLICATION

The present disclosure is part of a non-provisional patent application claiming the priority benefit of U.S. Provisional Patent Application No. 63/080,143, filed 18 Sep. 2020, the content of which being incorporated by reference in its entirety.

TECHNICAL FIELD

The present disclosure is generally related to wireless communications and, more particularly, to a trigger response mechanism for multi-link devices (MLDs) operating on a non-simultaneous-transmission-and-reception (NSTR) link pair in wireless communications.

BACKGROUND

Unless otherwise indicated herein, approaches described in this section are not prior art to the claims listed below and are not admitted as prior art by inclusion in this section.

A MLD operating on a NSTR link pair is a multi-link device that does not support simultaneous transmission on one link of the NSTR link pair and reception on another link of the NSTR link pair due to in-device coexistence (IDC) (also called NSTR based) interference. When a STA affiliated with a non-AP MLD that belongs to a NSTR link pair is transmitting on a link of the NSTR link pair, another STA affiliated with the MLD that belongs to the NSTR link pair may not be able to successfully receive a PPDU on the other link of the NSTR link pair due to NSTR based interference and update its network allocation vector (NAV) based on transmission opportunity (TXOP) duration information carried in the received PPDU, which is a virtual carrier-sensing mechanism used with wireless network protocols such as the Institute Electrical and Electronics Engineers (IEEE) 802.11. That is, during STA1 affiliated with the MLD's transmission on a first link (or link 1), the STA2 which is affiliated with the same MLD may not detect an ongoing transmission on a second link (or link 2) due to interference caused by transmit power leakage from link 1 so that the NAV cannot be updated on link 2 during STA1's transmission period which is called a blindness period (and hence STA2 lost medium synchronization and is in a blindness condition). If STA2 transmits on link 2 without updated NAV information, then the virtual channel sensing would not work properly and thus can lead to collision on link 2. This scenario is expected to occur frequently when most of non-access point (non-AP) MLDs are operating on a NSTR link pair. Therefore, there is a need for a solution of trigger response for MLDs operating on a NSTR link pair to address this issue.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to a trigger response mechanism for MLDs operating on a NSTR link pair in wireless communications. Under various proposed schemes in accordance with the present disclosure, it is believed that aforementioned issue may be addressed or otherwise alleviated.

In one aspect, a method may involve a station (STA) affiliated with an MLD that belongs to a NSTR link pair receiving a trigger frame from an access point (AP). The method may also involve the STA determining whether the STA is in a blindness condition responsive to receiving the trigger frame. The method may further involve the STA, in response to determining that the STA is in the blindness condition, transmitting a trigger-based (TB) physical-layer protocol data unit (PPDU) under the blindness condition with at least one restriction.

In another aspect, a method may involve a STA affiliated with an MLD that belongs to a NSTR link pair receiving a control frame from an AP. The method may also involve the STA determining whether the STA is in a blindness condition. The method may further involve the STA, in response to determining that the STA is in the blindness condition, transmitting a control response frame under the blindness condition with at least one restriction.

In yet another aspect, an apparatus implementable in an MLD operating on a NSTR link pair may include a transceiver and a processor coupled to the transceiver. The transceiver may be configured to wirelessly communicate with an AP. The processor may be configured to receive a trigger frame from the AP and determine whether a STA associated with the MLD that belongs to the NSTR link pair is in a blindness condition. In response to determining that the STA is in the blindness condition, the processor may transmit, via the transceiver, a TB PPDU under the blindness condition with at least one restriction.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, WiMax, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to a trigger response mechanism for NSTR MLDs in wireless communications. According to the present disclosure, a number of possible solutions may be implemented separately or jointly. That is, although these possible solutions may be described below separately, two or more of these possible solutions may be implemented in one combination or another.

Figure 1:
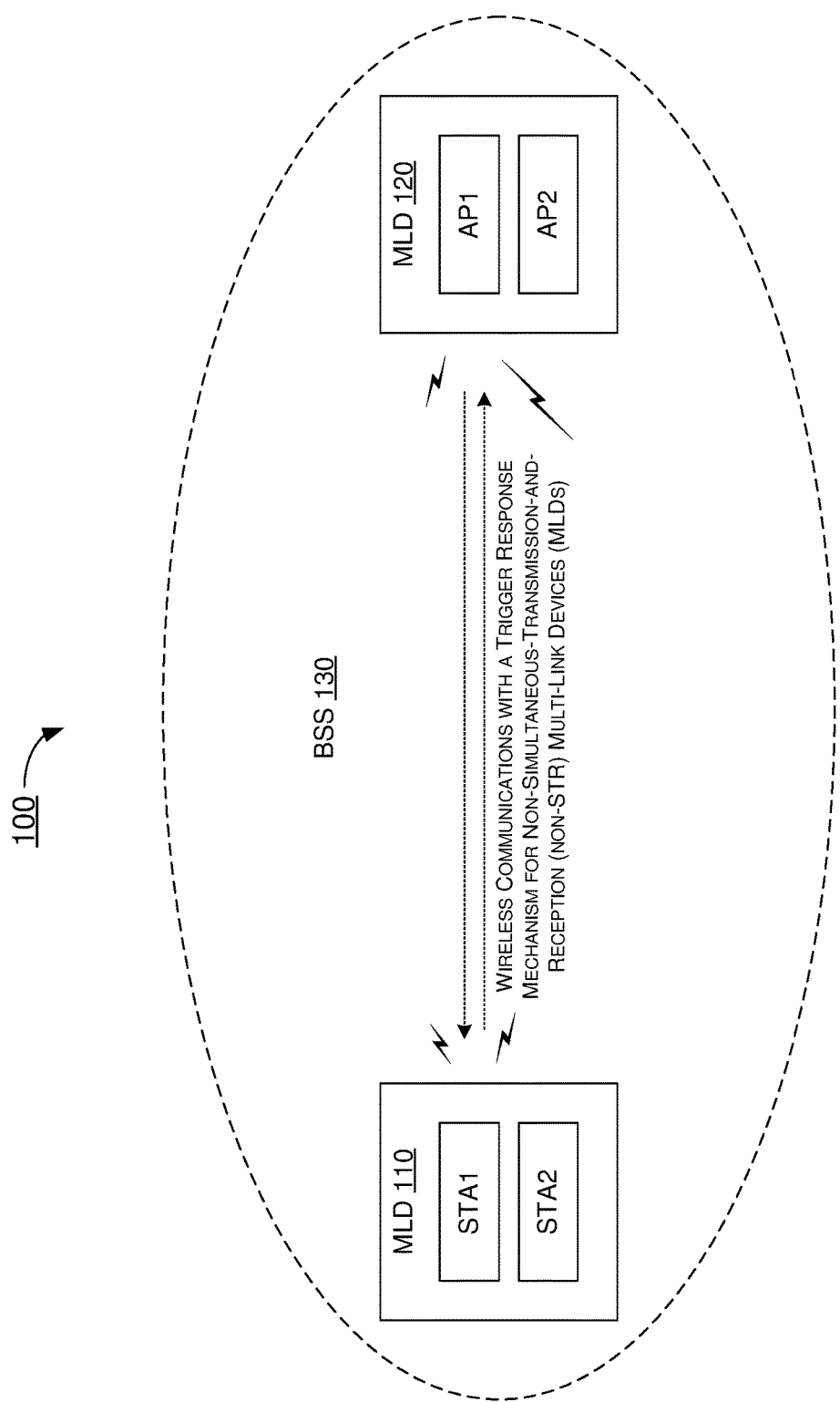
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2-FIG. 7 illustrate examples of implementation of various proposed schemes in network environment 100 in accordance with the present disclosure. The following description of various proposed schemes is provided with reference to FIG. 1-FIG. 7.

Referring to FIG. 1, network environment 100 may involve at least an MLD 110 and an MLD 120 communicating wirelessly with each other in a basic service set (BSS) 130 in accordance with one or more IEEE 802.11 standards (e.g., IEEE 802.11be and beyond). Each STA of multiple STAs (denoted as "STA1" and "STA2" in FIG. 1) affiliated with MLD 110 may function as a non-AP STA, and each STA of multiple STAs (denoted as "AP1" and "AP2" in FIG. 1) affiliated with MLD 120 may function as an AP STA. MLD 110 may be a non-AP MLD operating on a NSTR link pair. Moreover, MLD 110 may be configured to utilize a trigger response mechanism for NSTR MLDs in wireless communications in accordance with various proposed schemes, as described below.

It is noteworthy that the NAV of a STA affiliated with a MLD that operates on one link (which is a blind link) of a NSTR link pair may be out of date (e.g., due to loss of medium synchronization) after a transmission or transmission opportunity (TXOP) of another STA affiliated with the same MLD that operates on another link of the NSTR link pair. As such, it may become questionable as to whether an AP affiliated with an AP MLD that belongs to a NSTR link pair can transmit a trigger frame to a STA affiliated with a non-AP MLD that belongs to a NSTR link pair on the blind link. It may also become questionable as to how the STA would respond to the trigger frame if the STA has not yet updated its NAV (recovered medium synchronization) on the blind link. Besides, energy detection (ED)-based clear channel assessment (CCA) may be idle during a short interframe space (SIFS) interval between the trigger frame and a TB PPDU sent in response to the trigger frame, even though there might be ongoing TXOP of an overlapping BSS (OBSS), thereby causing a fairness issue for STAs of the OBSS.

Figure 2:
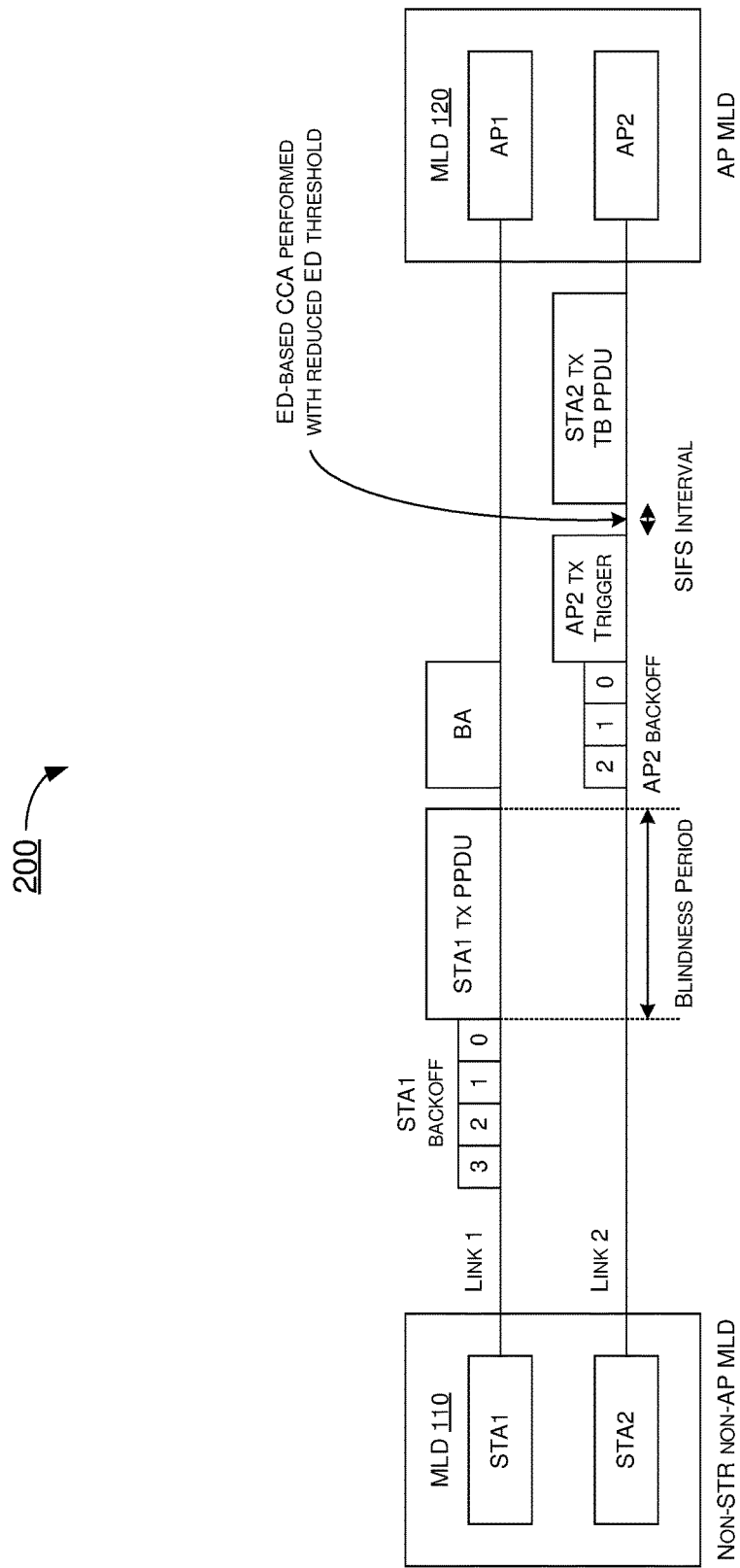
FIG. 2 is a diagram of an example scenario in accordance with the present disclosure.

FIG. 2 illustrates an example scenario 200 under a proposed scheme in accordance with the present disclosure with respect to trigger-based uplink (UL) transmissions. Under the proposed scheme, after the end of a blindness period and before its NAV is updated (e.g., NAV is updated when receives a PPDU with a valid TXOP duration information) or before a NAV synchronization delay (NAVSyncdelay) timer counts down to zero on the blind link, whichever happens first, a non-AP STA of MLD 110 (e.g., STA2) may be under a blindness condition and may not respond to a trigger frame from an AP of MLD 120 (e.g., AP2) with a channel sensing (CS) requirement and intended for the non-AP STA in case the inter-BSS NAV (basic NAV) of the non-AP STA is not zero. Under the proposed scheme, the non-AP STA may respond to a trigger frame intended for the non-AP STA in case its basic NAV is zero with at least one of certain restrictions. One of the restrictions may be that the non-AP STA (e.g., STA2) may detect channel idle by performing an ED-based CCA with a ED threshold designated for the blindness condition to be more sensitive in the energy detection (e.g., within the range of −82 dBm to −62 dBm, or at a fixed value within the range such as −72 dBm) during the SIFS interval between the trigger frame and the TB PPDU. Another restriction may be that the UL power headroom (the information of which is carried in the TB PPDU) for the assigned modulation coding scheme (MCS) may be reduced (e.g., based on a power reduction requirement due to blindness issue).

Under the proposed scheme, the non-AP STA under blindness condition that transmits a TB PPDU may transmit the dB value of its UL power headroom (UPH) in the UPH Control subfield carried in the TB PPDU, as a way to assist in the MCS selection by the AP for a subsequent TB PPDU. The UL power headroom ($HR_{STA}$) for the assigned MCS may be defined in the following expression:

$$HR_{STA} = TX_{pwr}(Max) - TX_{pwr}(STA).$$

In the expression, $TX_{pwr}(Max)$ may represent the maximum UL transmit power of a TB PPDU with the assigned MCS after considering hardware capability, regulatory requirements and local maximum transmit power levels, non-802.11 IDC requirements, and power reduction requirement(s) under the blindness condition. Also, $TX_{pwr}(STA)$ may represent the current UL transmit power of the TB PPDU of the assigned MCS, which may be determined by power control and subject to the capabilities of the non-AP STA and other requirements such as expected received signal power of the assigned MCS indicated by the AP in the trigger frame or trigger information, as well as power reduction requirement(s) under the blindness condition. Under the proposed scheme, the non-AP STA under a blindness condition may transmit the TB PPDU at its minimum power for the assigned MCS. Moreover, the non-AP STA under the blindness condition may indicate the Minimum Transmit Power Flag in the UPH Control subfield carried in the TB PPDU to assist in the MCS selection by the AP for the subsequent TB PPDU.

Figure 3:
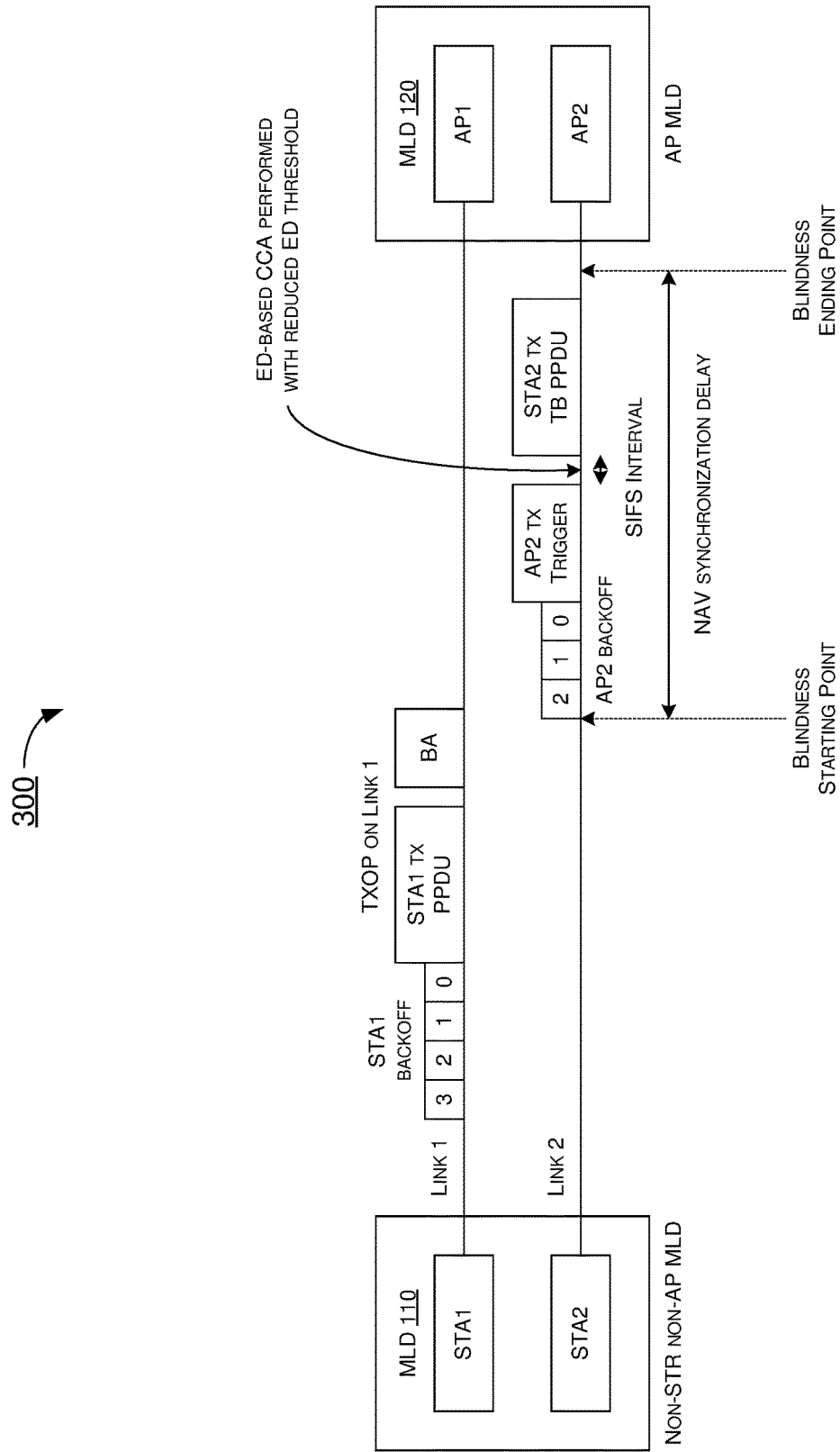
FIG. 3 is a diagram of an example scenario in accordance with the present disclosure.

FIG. 3 illustrates an example scenario 300 under another proposed scheme in accordance with the present disclosure with respect to trigger-based UL transmissions. Under the proposed scheme, an AP MLD (e.g., MLD 120) may determine that a non-AP STA (e.g., STA1 and/or STA2) affiliated with a non-AP MLD that belongs to a NSTR link pair might be under a blindness condition. For instance, at an end of a TXOP on one link (e.g., link 1) in which an AP affiliated with the AP MLD is participating with a non-AP STA affiliated with a NSTR non-AP MLD (e.g., MLD 110), or with an indication from the NSTR non-AP STA of the blindness condition (e.g., an indication in the UPH Control subfield of the TB PDU), the AP MLD may determine the start of the blindness condition of the NSTR non-AP MLD on the other link (e.g., link 2) of the NSTR pair of links. Moreover, when the non-AP STA affiliated with the same NSTR non-AP MLD on the other link (e.g., link 2) starts to transmit to the AP or when the NAVSyncdelay timer at the AP side reaches zero, whichever happens first, or when the NSTR non-AP STA indicates an end of the blindness condition (e.g., an indication in the UPH Control subfield of the TB PPDU), the AP MLD may determine the end of the blindness condition of the NSTR non-AP MLD. Under the proposed scheme, an AP that transmits a trigger frame or trigger information to a non-AP STA under blindness condition may assign the non-AP STA a certain level of MCS lower than that under a regular, non-blindness condition.

Figure 4:
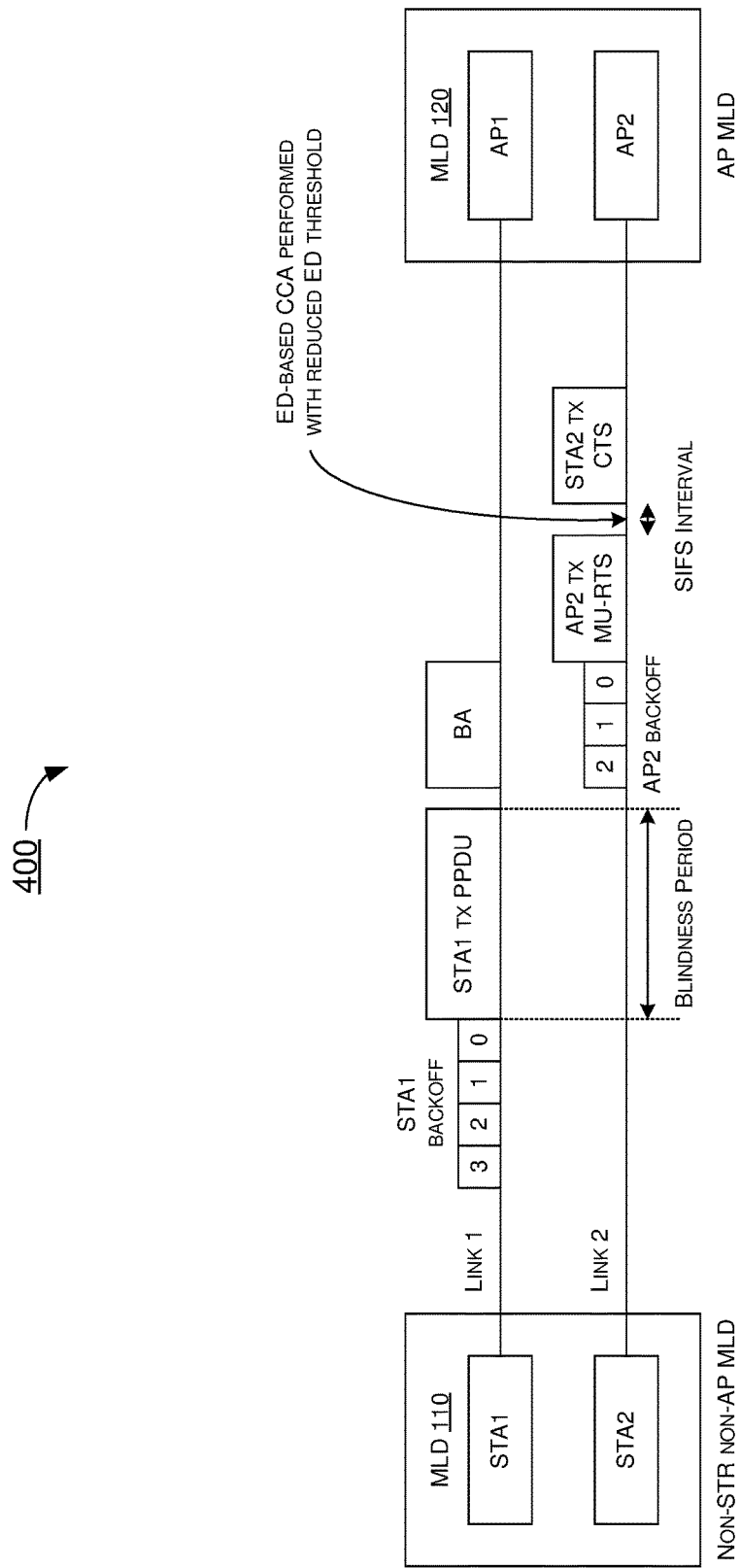
FIG. 4 is a diagram of an example scenario in accordance with the present disclosure.

FIG. 4 illustrates an example scenario 400 under a proposed scheme in accordance with the present disclosure with respect to downlink (DL) transmissions. Under the proposed scheme, a non-AP STA of a NSTR MLD (e.g., MLD 110) may perform certain operations when the non-AP STA is under a blindness condition, in case an AP intends to initiate a DL transmission with the non-AP STA with multi-user request-to-send and clear-to-send (MU-RTS/CTS) protection. For instance, the non-AP STA may not respond to the MU-RTS intended for it in case the inter-BSS NAV (basic NAV) of the non-AP STA is not zero. Moreover, the non-AP STA may respond to the MU-RTS in case its basic NAV is zero with the restriction that the non-AP STA detects channel idle by performing an ED-based CCA with a designated ED threshold (e.g., within the range of −82 dBm to −62 dBm, or at a fixed value within the range such as −72 dBm) during the SIFS interval between the MU-RTS trigger frame and the CTS response.

Illustrative Implementations

Figure 5:
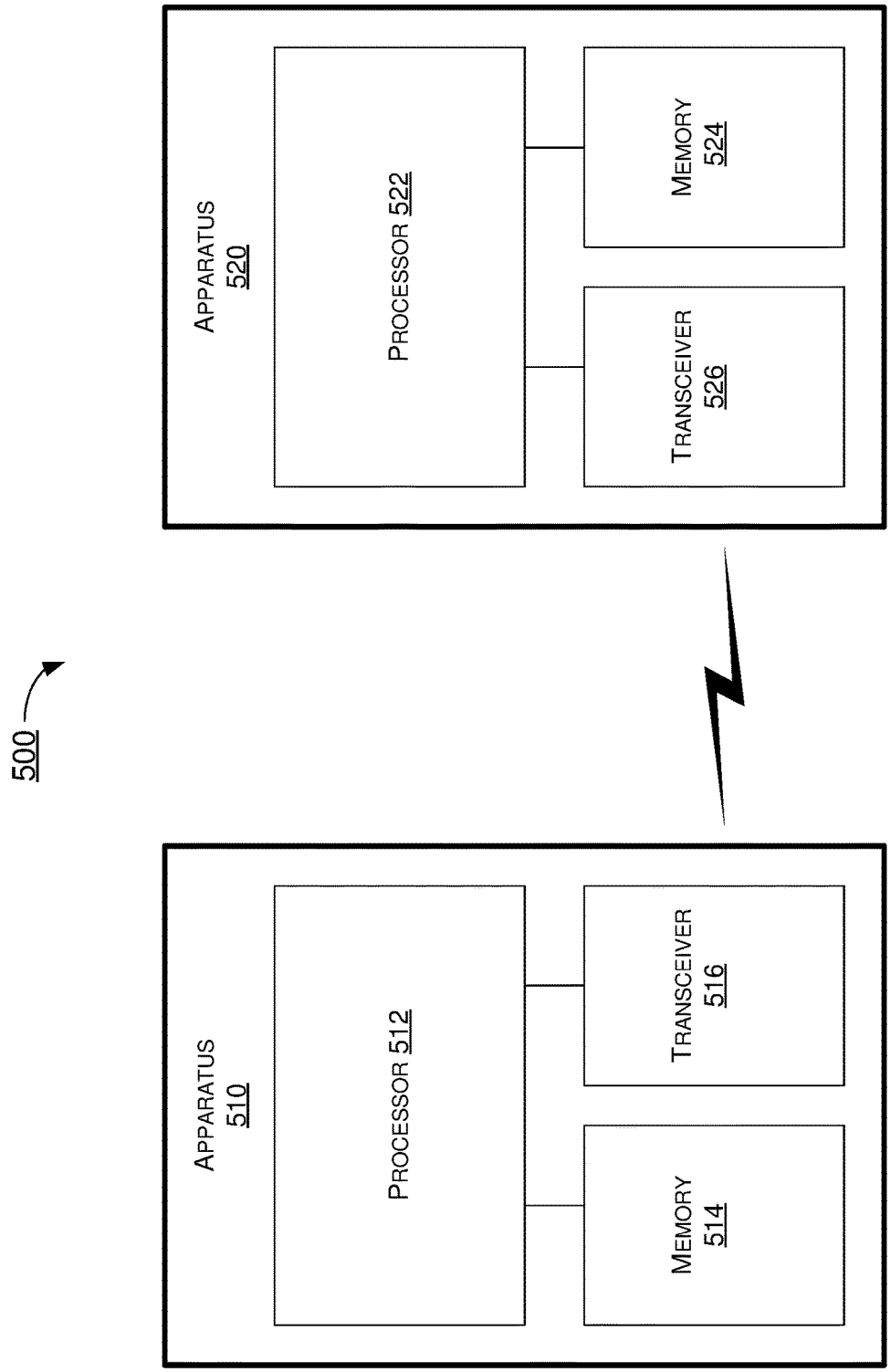
FIG. 5 is a block diagram of an example communication system in accordance with an implementation of the present disclosure.

FIG. 5 illustrates an example system 500 having at least an example apparatus 510 and an example apparatus 520 in accordance with an implementation of the present disclosure. Each of apparatus 510 and apparatus 520 may perform various functions to implement schemes, techniques, processes and methods described herein pertaining to a trigger response mechanism for NSTR MLDs in wireless communications, including the various schemes described above with respect to various proposed designs, concepts, schemes, systems and methods described above as well as processes described below. For instance, apparatus 510 may be implemented in STA 110 and apparatus 520 may be implemented in STA 120, or vice versa.

Each of apparatus 510 and apparatus 520 may be a part of an electronic apparatus, which may be a non-AP MLD or an AP MLD, such as a portable or mobile apparatus, a wearable apparatus, a wireless communication apparatus or a computing apparatus. When implemented in a non-AP MLD, each of apparatus 510 and apparatus 520 may be implemented in a smartphone, a smart watch, a personal digital assistant, a digital camera, or a computing equipment such as a tablet computer, a laptop computer or a notebook computer. Each of apparatus 510 and apparatus 520 may also be a part of a machine type apparatus, which may be an IoT apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in a network node, such as an AP MLD in a WLAN.

In some implementations, each of apparatus 510 and apparatus 520 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 510 and apparatus 520 may be implemented in or as a non-AP MLD or an AP MLD. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, processor 512 and processor 522 may be implemented in the form of one or more single-core processors, one or more multi-core processors, one or more RISC processors or one or more CISC processors. That is, even though a singular term "a processor" is used herein to refer to processor 512 and processor 522, processor 512 and processor 522 may include multiple processors in some implementations and a single processor in other implementations in accordance with the present disclosure. In another aspect, processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 512 and processor 522 is a special-purpose machine specifically designed, arranged and configured to perform specific tasks including those pertaining to a trigger response mechanism for NSTR MLDs in wireless communications in accordance with various implementations of the present disclosure.

In some implementations, apparatus 510 may also include a transceiver 516 coupled to processor 512. Transceiver 516 may include a transmitter capable of wirelessly transmitting and a receiver capable of wirelessly receiving data. In some implementations, apparatus 520 may also include a transceiver 526 coupled to processor 522. Transceiver 526 may include a transmitter capable of wirelessly transmitting and a receiver capable of wirelessly receiving data.

In some implementations, apparatus 510 may further include a memory 514 coupled to processor 512 and capable of being accessed by processor 512 and storing data therein. In some implementations, apparatus 520 may further include a memory 524 coupled to processor 522 and capable of being accessed by processor 522 and storing data therein. Each of memory 514 and memory 524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 510 and apparatus 520 may be a communication entity capable of communicating with each other using various proposed schemes in accordance with the present disclosure. For illustrative purposes and without limitation, a description of capabilities of apparatus 510, as MLD 110 (e.g., a non-AP MLD operating on a NSTR link pair), and apparatus 520, as MLD 120 (e.g., an AP MLD), is provided below. It is noteworthy that, although the example implementations described below are provided in the context of WLAN, the same may be implemented in other types of networks. It is also noteworthy that, although examples described below are provide in the context of apparatus 510, the examples may also be applicable to apparatus 520 or otherwise implemented by apparatus 520.

Under a proposed scheme pertaining to a trigger response mechanism for NSTR MLDs in wireless communications in accordance with the present disclosure, with apparatus 510 implementing a STA affiliated with a non-AP MLD that belongs to a NSTR link pair (e.g., MLD 110) and apparatus 520 implementing an AP affiliated with an AP MLD (e.g., MLD 120), processor 512 may receive, via transceiver 516, a trigger frame from an AP of apparatus 520. Additionally, processor 512 may determine whether the STA is in a blindness condition responsive to receiving the trigger frame. Furthermore, processor 512, in response to determining that the STA is in the blindness condition, may transmit, via transceiver 516, a TB PPDU to the AP of apparatus 520 under the blindness condition with at least one restriction.

In some implementations, in transmitting the TB PPDU under the blindness condition with the at least one restriction, processor 512 may perform certain operations. For instance, processor 512 may perform, via transceiver 516, an ED-based CCA with a ED threshold designated for the blindness condition (e.g., a reduced ED threshold) during a SIFS interval between the trigger frame and the TB PPDU. Moreover, processor 512 may transmit, via transceiver 516, the TB PPDU on a link responsive to a result of the ED-based CCA with the designated ED threshold indicating a channel on the link being idle. In some implementations, the designated ED threshold may be in a range of −82 dBm to −62 dBm or at a fixed value within the range (e.g., −72 dBm) under the blindness condition.

In some implementations, in transmitting the TB PPDU with the at least one restriction, processor 512 may transmit the TB PPDU with an UPH corresponding to an assigned MCS being reduced. In some implementations, the UPH corresponding to the assigned MCS may be a difference between a maximum UL transmit power of the TB PPDU corresponding to the assigned MCS ($TX_{pwr}(Max)$) and a current UL transmit power of the TB PPDU for the assigned MCS ($TX_{pwr}(STA)$). The maximum UL transmit power may be determined based on at least one of one or more hardware capabilities, one or more regulatory requirements, one or more local maximum transmit power levels, one or more IDC requirements, and a power reduction requirement under a blindness condition. The current UL transmit power may be determined based on at least one of power control, the one or more hardware capabilities, an expected receive signal power for the assigned MCS, and the power reduction requirement under a blindness condition.

In some implementations, in transmitting the TB PPDU with the at least one restriction, processor 512 may transmit the TB PPDU at a minimum power corresponding to an assigned MCS.

In some implementations, in transmitting the TB PPDU, processor 512 may transmit the TB PPDU with a Minimum Transmit Power flag indicated in an UPH Control subfield carried in the TB PPDU to assist the AP in MCS selection for a subsequent TB PPDU.

In some implementations, in transmitting the TB PPDU, processor 512 may transmit the TB PPDU with a value of an UPH indicated in an UPH Control subfield carried in the TB PPDU to assist the AP in MCS selection for a subsequent TB PPDU.

In some implementations, in determining whether the STA is in the blindness condition, processor 512 may determine the STA affiliated with the MLD that belongs to a NSTR link pair is in the blindness condition. In such cases, the STA has lost medium synchronization when another STA, which is affiliated with the same MLD and belongs to the NSTR link pair, transmits a PPDU. Moreover, after an end of transmission of the PPDU, the STA starts a medium synchronization delay timer and is in the blindness condition until the medium synchronization delay timer is zero by either counting down to zero or resetting to zero when obtaining a valid TXOP duration information to update a NAV from a received PPDU, whichever happens first.

In some implementations, processor 512 may perform additional operations. For instance, processor 512 may receive, via transceiver 516, a control frame (e.g., MU-RTS) from the AP. Additionally, processor 512 may determine whether the STA is in a blindness condition responsive to receiving the control frame. Moreover, processor 512 may, in response to determining that the STA is in the blindness condition, transmit, via transceiver 516, a control response frame (e.g., CTS) under the blindness condition with at least one other restriction. In such cases, in transmitting the control response frame under the blindness condition with the at least one other restriction, processor 512 may perform certain operations. For instance, processor 512 may perform, via transceiver 516, an ED-based CCA with a ED threshold designated for the blindness condition (e.g., a reduced ED threshold) during a SIFS interval between the control frame and the control response frame. Furthermore, processor 512 may transmit, via transceiver 516, the control response frame on a link responsive to a result of the ED-based CCA with the designated ED threshold indicating a channel on the link being idle. In some implementations, the designated ED threshold is in a range of −82 dBm to −62 dBm or at a fixed value within the range (e.g., −72 dBm) under the blindness condition.

Under another proposed scheme pertaining to a trigger response mechanism for NSTR MLDs in wireless communications in accordance with the present disclosure, with apparatus 510 implementing a STA affiliated with a MLD that belongs to a NSTR link pair (e.g., MLD 110) and apparatus 520 implementing an AP affiliated with an AP MLD (e.g., MLD 120), processor 512 may receive, via transceiver 516, a control frame (e.g., MU-RTS) from an AP of apparatus 520. Moreover, processor 512 may determine whether the STA is in a blindness condition. Furthermore, processor 512 may, in response to determining that the STA is in the blindness condition, transmit a control response frame (e.g., CTS) under the blindness condition to the AP of apparatus 520 with at least one restriction.

In some implementations, in transmitting the control response frame under the blindness condition with the at least one restriction, processor 512 may perform certain operations. For instance, processor 512 may perform, via transceiver 516, an ED-based CCA with a ED threshold designated for the blindness condition (e.g., a reduced ED threshold) during a SIFS interval between the control frame and the control response frame. Furthermore, processor 512 may transmit, via transceiver 516, the control response frame on a link responsive to a result of the ED-based CCA with the designated ED threshold indicating a channel on the link being idle. In some implementations, the designated ED threshold may be in a range of −82 dBm to −62 dBm or at a fixed value within the range (e.g., −72 dBm) under the blindness condition.

Illustrative Processes

Figure 6:
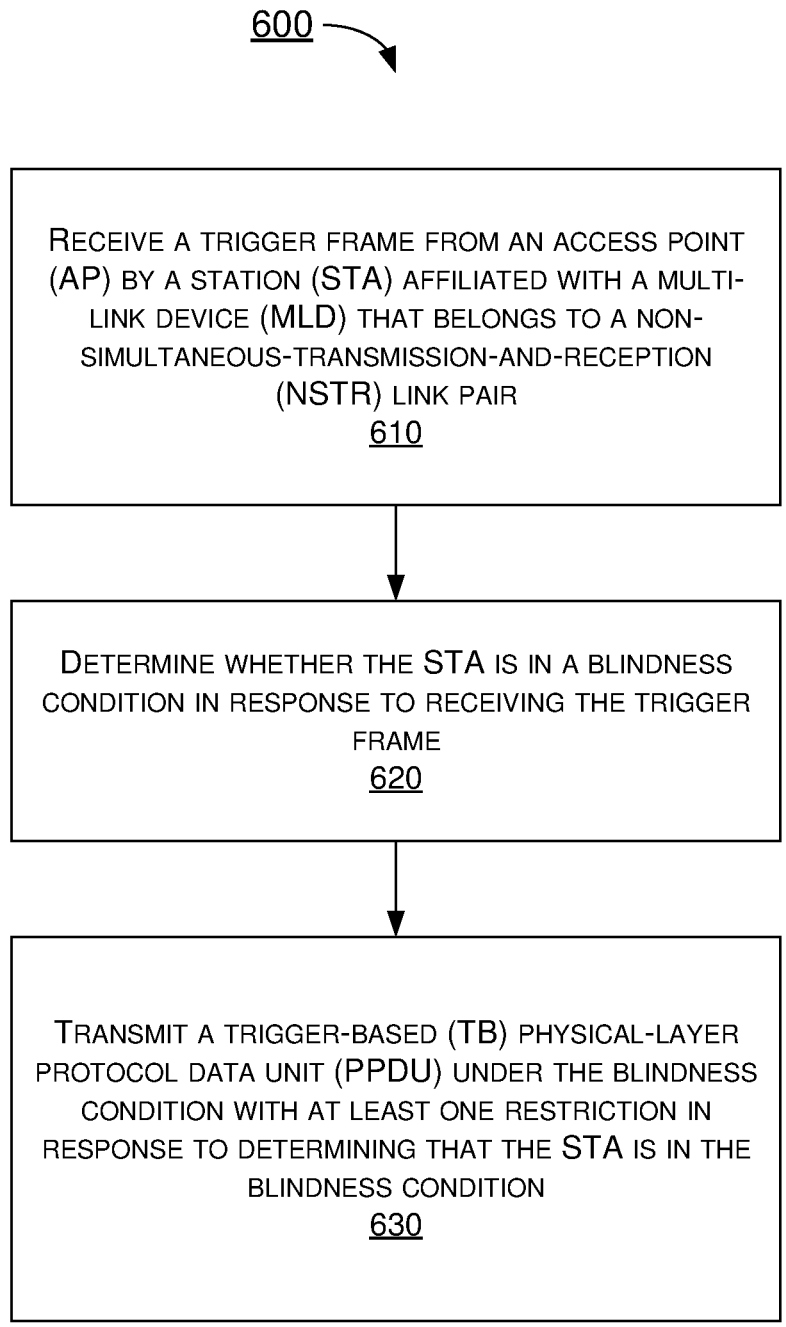
FIG. 6 is a flowchart of an example process in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to a trigger response mechanism for NSTR MLDs in wireless communications in accordance with the present disclosure. Process 600 may include one or more operations, actions, or functions as illustrated by one or more of blocks 610, 620 and 630. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed repeatedly or iteratively. Process 600 may be implemented by or in apparatus 510 and apparatus 520 as well as any variations thereof. Solely for illustrative purposes and without limiting the scope, process 600 is described below in the context of apparatus 510 implemented in or as MLD 110 and apparatus 520 implemented in or as MLD 120 of a wireless network such as a WLAN in network environment 100 in accordance with one or more of IEEE 802.11 standards. It is noteworthy that, although examples described below are provide in the context of apparatus 510 implementing a STA affiliated with a non-AP MLD that belongs to a NSTR link pair (e.g., MLD 110) and apparatus 520 implementing an AP affiliated with an AP MLD (e.g., MLD 120). Process 600 may begin at block 610.

At 610, process 600 may involve processor 512 receiving, via transceiver 516, a trigger frame from an AP of apparatus 520. Process 600 may proceed from 610 to 620.

At 620, process 600 may involve processor 512 determining whether the STA is in a blindness condition responsive to receiving the trigger frame. Process 600 may proceed from 620 to 630.

At 630, process 600 may involve processor 512, in response to determining that the STA is in the blindness condition, transmitting, via transceiver 516, a TB PPDU under the blindness condition to the AP of apparatus 520 with at least one restriction.

In some implementations, in transmitting the TB PPDU under the blindness condition with the at least one restriction, process 600 may involve processor 512 performing certain operations. For instance, process 600 may involve processor 512 performing, via transceiver 516, an ED-based CCA with a ED threshold designated for the blindness condition (e.g., a reduced ED threshold) during a SIFS interval between the trigger frame and the TB PPDU. Moreover, process 600 may involve processor 512 transmitting, via transceiver 516, the TB PPDU on a link responsive to a result of the ED-based CCA with the designated ED threshold indicating a channel on the link being idle. In some implementations, the designated ED threshold may be in a range of −82 dBm to −62 dBm or at a fixed value within the range (e.g., −72 dBm) under the blindness condition.

In some implementations, in transmitting the TB PPDU with the at least one restriction, process 600 may involve processor 512 transmitting the TB PPDU with an UPH corresponding to an assigned MCS being reduced. In some implementations, the UPH corresponding to the assigned MCS may be a difference between a maximum UL transmit power of the TB PPDU corresponding to the assigned MCS ($TX_{pwr}(Max)$) and a current UL transmit power of the TB PPDU for the assigned MCS ($TX_{pwr}(STA)$). The maximum UL transmit power may be determined based on at least one of one or more hardware capabilities, one or more regulatory requirements, one or more local maximum transmit power levels, one or more IDC requirements, and a power reduction requirement under a blindness condition. The current UL transmit power may be determined based on at least one of power control, the one or more hardware capabilities, an expected receive signal power for the assigned MCS, and the power reduction requirement under a blindness condition.

In some implementations, in transmitting the TB PPDU with the at least one restriction, process 600 may involve processor 512 transmitting the TB PPDU at a minimum power corresponding to an assigned MCS.

In some implementations, in transmitting the TB PPDU, process 600 may involve processor 512 transmitting the TB PPDU with a Minimum Transmit Power flag indicated in an UPH Control subfield carried in the TB PPDU to assist the AP in MCS selection for a subsequent TB PPDU.

In some implementations, in transmitting the TB PPDU, process 600 may involve processor 512 transmitting the TB PPDU with a value of an UPH indicated in an UPH Control subfield carried in the TB PPDU to assist the AP in MCS selection for a subsequent TB PPDU.

In some implementations, in determining whether the STA is in the blindness condition, process 600 may involve processor 512 determining the STA affiliated with the MLD that belongs to a NSTR link pair is in the blindness condition. In such cases, the STA has lost medium synchronization when another STA, which is affiliated with the same MLD and belongs to the NSTR link pair, transmits a PPDU. Moreover, after an end of transmission of the PPDU, the STA starts a medium synchronization delay timer and is in the blindness condition until the medium synchronization delay timer is zero by either counting down to zero or resetting to zero when obtaining a valid TXOP duration information to update a NAV from a received PPDU, whichever happens first.

In some implementations, process 600 may involve processor 512 performing additional operations. For instance, process 600 may involve processor 512 receiving, via transceiver 516, a control frame (e.g., MU-RTS) from the AP. Additionally, process 600 may involve processor 512 determining whether the STA is in the blindness condition responsive to receiving the control frame. Moreover, process 600 may involve processor 512, in response to determining that the STA is in the blindness condition, transmitting, via transceiver 516, a control response frame (e.g., CTS) under the blindness condition with at least one other restriction. In such cases, in transmitting the control response frame under the blindness condition with the at least one other restriction, process 600 may involve processor 512 performing certain operations. For instance, process 600 may involve processor 512 performing, via transceiver 516, an ED-based CCA with a ED threshold designated for the blindness condition (e.g., a reduced ED threshold) during a SIFS interval between the control frame and the control response frame. Furthermore, process 600 may involve processor 512 transmitting, via transceiver 516, the control response frame on a link responsive to a result of the ED-based CCA with the designated ED threshold indicating a channel on the link being idle. In some implementations, the designated ED threshold is in a range of −82 dBm to −62 dBm or at a fixed value within the range (e.g., −72 dBm).

Figure 7:
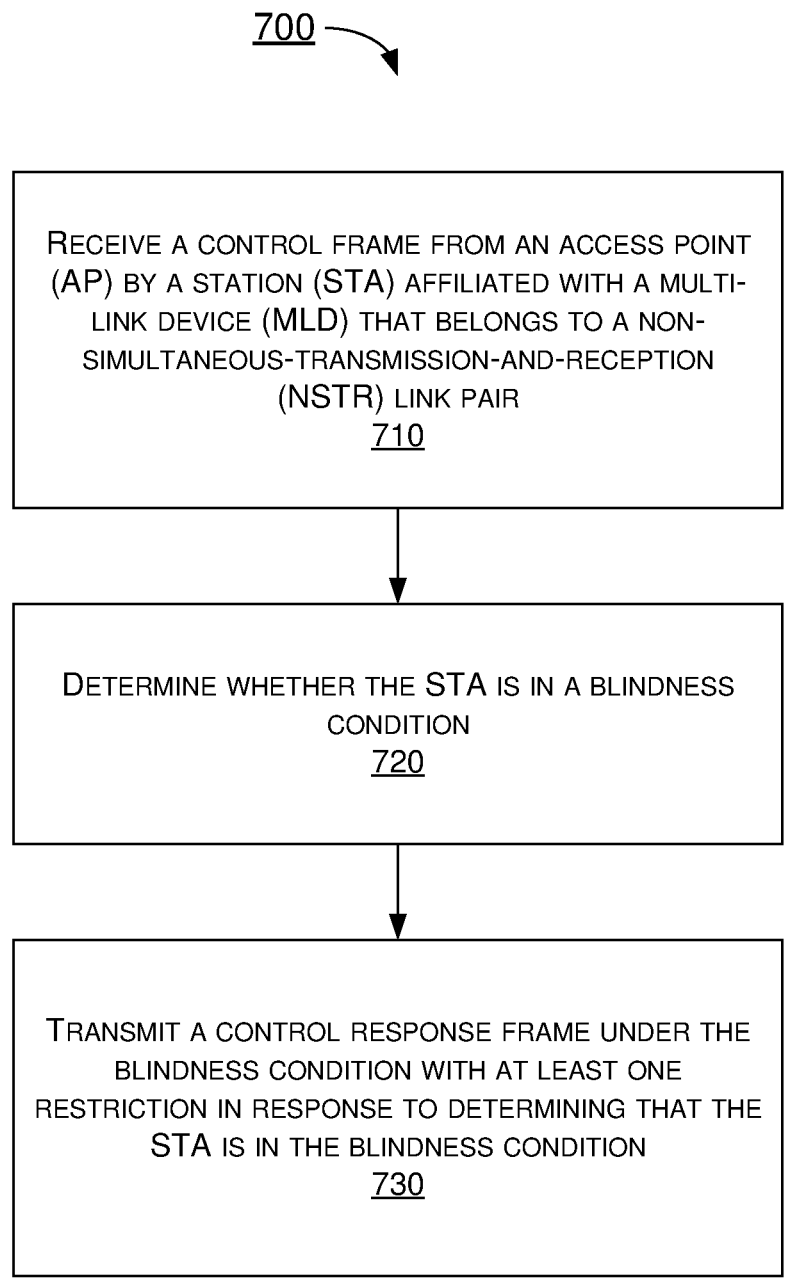
FIG. 7 is a flowchart of an example process in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above. More specifically, process 700 may represent an aspect of the proposed concepts and schemes pertaining to a trigger response mechanism for NSTR MLDs in wireless communications in accordance with the present disclosure. Process 700 may include one or more operations, actions, or functions as illustrated by one or more of blocks 710, 720 and 730. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed repeatedly or iteratively. Process 700 may be implemented by or in apparatus 510 and apparatus 520 as well as any variations thereof. Solely for illustrative purposes and without limiting the scope, process 700 is described below in the context of apparatus 510 implemented in or as MLD 110 and apparatus 520 implemented in or as MLD 120 of a wireless network such as a WLAN in network environment 100 in accordance with one or more of IEEE 802.11 standards. It is noteworthy that, although examples described below are provide in the context of apparatus 510 implementing a STA affiliated with a non-AP MLD that belongs to a NSTR link pair (e.g., MLD 110) and apparatus 520 implementing an AP affiliated with an AP MLD (e.g., MLD 120). Process 700 may begin at block 710.

At 710, process 700 may involve processor 512 receiving, via transceiver 516, a control frame (e.g., MU-RTS) from an AP of apparatus 520. Process 700 may proceed from 710 to 720.

At 720, process 700 may involve processor 512 determining whether the STA is in a blindness condition. Process 700 may proceed from 720 to 730.

At 730, process 700 may involve processor 512, in response to determining that the STA is in the blindness condition, transmitting a control response frame (e.g., CTS) under the blindness condition to the AP of apparatus 520 with at least one restriction.

In some implementations, in transmitting the control response frame under the blindness condition with the at least one restriction, process 700 may involve processor 512 performing certain operations. For instance, process 700 may involve processor 512 performing, via transceiver 516, an ED-based CCA with a ED threshold designated for the blindness condition (e.g., a reduced ED threshold) during a SIFS interval between the control frame and the control response frame. Furthermore, process 700 may involve processor 512 transmitting, via transceiver 516, the control response frame on a link responsive to a result of the ED-based CCA with the designated ED threshold indicating a channel on the link being idle. In some implementations, the designated ED threshold may be in a range of −82 dBm to −62 dBm or at a fixed value within the range (e.g., −72 dBm) under the blindness condition.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    receiving a trigger frame from an access point (AP) by a station (STA) affiliated with a multi-link device (MLD) on a first link of a non-simultaneous-transmission-and-reception (NSTR) link pair;
    determining whether the STA is in a blindness condition on the first link responsive to receiving the trigger frame; and
    responsive to determining that the STA is in the blindness condition, transmitting a trigger-based (TB) physical-layer protocol data unit (PPDU) on the first link under the blindness condition on the first link with at least one restriction.

2. The method of claim 1, wherein the transmitting of the TB PPDU under the blindness condition with the at least one restriction comprises:
    performing an energy detection (ED)-based clear channel assessment (CCA) with a ED threshold designated for the blindness condition during a short interframe space (SIFS) interval between the trigger frame and the TB PPDU; and
    transmitting the TB PPDU on a link responsive to a result of the ED-based CCA with the designated ED threshold indicating a channel on the link being idle.

3. The method of claim 2, wherein the designated ED threshold is in a range of −82 dBm to −62 dBm or at a fixed value within the range under the blindness condition.

4. The method of claim 1, wherein the transmitting of the TB PPDU with the at least one restriction comprises transmitting the TB PPDU with an uplink (UL) power headroom (UPH) corresponding to an assigned modulation coding scheme (MCS) being reduced.

5. The method of claim 4, wherein the UPH corresponding to the assigned MCS comprises a difference between a maximum UL transmit power of the TB PPDU corresponding to the assigned MCS and a current UL transmit power of the TB PPDU for the assigned MCS, wherein the maximum UL transmit power is determined based on at least one of one or more hardware capabilities, one or more regulatory requirements, one or more local maximum transmit power levels, one or more in-device coexistence (IDC) requirements, and a power reduction requirement under a blindness condition, and wherein the current UL transmit power is determined based on at least one of power control, the one or more hardware capabilities, an expected receive signal power for the assigned MCS, and the power reduction requirement under a blindness condition.

6. The method of claim 1, wherein the transmitting of the TB PPDU with the at least one restriction comprises transmitting the TB PPDU at a minimum power corresponding to an assigned modulation coding scheme (MCS).

7. The method of claim 1, wherein the transmitting of the TB PPDU comprises transmitting the TB PPDU with a Minimum Transmit Power flag indicated in an uplink (UL) power headroom (UPH) Control subfield carried in the TB PPDU to assist the AP in modulation coding scheme (MCS) selection for a subsequent TB PPDU.

8. The method of claim 1, wherein the transmitting of the TB PPDU comprises transmitting the TB PPDU with a value of an uplink (UL) power headroom (UPH) indicated in an UPH Control subfield carried in the TB PPDU to assist the AP in modulation coding scheme (MCS) selection for a subsequent TB PPDU.

9. The method of claim 1, wherein the determining of whether the STA is in the blindness condition comprises determining the STA affiliated with the MLD that belongs to a NSTR link pair is in the blindness condition, wherein the STA has lost medium synchronization when another STA, which is affiliated with the same MLD and belongs to the NSTR link pair, transmits a PPDU, and wherein, after an end of transmission of the PPDU, the STA starts a medium synchronization delay timer and is in the blindness condition until the medium synchronization delay timer is zero by either counting down to zero or resetting to zero when obtaining a valid transmission opportunity (TXOP) duration information to update a network allocation vector (NAV) from a received PPDU, whichever happens first.

10. The method of claim 1, further comprising:
receiving a control frame from the AP;
determining whether the STA is in the blindness condition responsive to receiving the control frame; and
responsive to determining that the STA is in the blindness condition, transmitting a control response frame under the blindness condition with at least one other restriction.

11. The method of claim 10, wherein the transmitting of the control response frame under the blindness condition with the at least one other restriction comprises:
performing an energy detection (ED)-based clear channel assessment (CCA) with a ED threshold designated for the blindness condition during a short interframe space (SIFS) interval between the control frame and the control response frame; and
transmitting the control response frame on a link responsive to a result of the ED-based CCA with the designated ED threshold indicating a channel on the link being idle.

12. The method of claim 11, wherein the designated ED threshold is in a range of −82 dBm to −62 dBm or at a fixed value within the range under the blindness condition.

13. A method, comprising:
receiving a control frame from an access point (AP) by a station (STA) affiliated with a multi-link device (MLD) on a first link of a non-simultaneous-transmission-and-reception (NSTR) link pair;
determining whether the STA is in a blindness condition on the first link; and
responsive to determining that the STA is in the blindness condition, transmitting a control response frame on the first link under the blindness condition on the first link with at least one restriction.

14. The method of claim 13, wherein the transmitting of the control response frame under the blindness condition with the at least one restriction comprises:
performing an energy detection (ED)-based clear channel assessment (CCA) with a designated ED threshold during a short interframe space (SIFS) interval between the control frame and the control response frame; and
transmitting the control response frame on a link responsive to a result of the ED-based CCA with the designated ED threshold indicating a channel on the link being idle.

15. The method of claim 14, wherein the designated ED threshold is in a range of −82 dBm to −62 dBm or at a fixed value within the range under the blindness condition.

16. An apparatus implementable in a multi-link device (MLD) with a non-simultaneous-transmission-and-reception (NSTR) link pair, comprising:
a transceiver configured to communicate wirelessly; and
a processor coupled to the transceiver and configured to perform operations comprising:
receiving, via the transceiver, a trigger frame from an access point (AP) on a first link of the NSTR link pair;
determining whether a station (STA) associated with the MLD that belongs to the NSTR link pair is in a blindness condition on the first link; and
responsive to determining that the STA is in the blindness condition, transmitting, via the transceiver, a trigger-based (TB) physical-layer protocol data unit (PPDU) on the first link under the blindness condition on the first link with at least one restriction.

17. The apparatus of claim 16, wherein, in transmitting the TB PPDU under the blindness condition with the at least one restriction, the processor is configured to perform operations comprising:
performing an energy detection (ED)-based clear channel assessment (CCA) with a ED threshold designated for the blindness condition during a short interframe space (SIFS) interval between the trigger frame and the TB PPDU; and
transmitting the TB PPDU on a link responsive to a result of the ED-based CCA with the designated ED threshold indicating a channel on the link being idle.

18. The apparatus of claim 17, wherein the designated ED threshold is in a range of −82 dBm to −62 dBm or at a fixed value within the range under the blindness condition.

19. The apparatus of claim 16, wherein, in transmitting the TB PPDU with the at least one restriction, the processor is configured to transmit the TB PPDU with an uplink (UL) power headroom (UPH) corresponding to an assigned modulation coding scheme (MCS) being reduced.

20. The method of claim 16, wherein, in determining whether the STA is in the blindness condition on the link, the processor is configured to determine the STA affiliated with the MLD that belongs to a NSTR link pair is in the blindness condition, wherein the STA has lost medium synchronization when another STA, which is affiliated with the same MLD and belongs to the NSTR link pair, transmits a PPDU; and wherein, after an end of transmission of the PPDU, the STA starts a medium synchronization delay timer and is in the blindness condition until the medium synchronization delay timer is zero by either counting down to zero or resetting to zero when obtaining a valid transmission opportunity (TXOP) duration information to update a network allocation vector (NAV) from a received PPDU, whichever happens first.

* * * * *